US010616283B2

(12) United States Patent
Mufti et al.

(10) Patent No.: US 10,616,283 B2
(45) Date of Patent: *Apr. 7, 2020

(54) TELECOMMUNICATIONS NETWORK CALL CONTROL

(71) Applicant: T-Mobile USA, Inc., Bellevue, WA (US)

(72) Inventors: Shujaur Mufti, Snoqualmie, WA (US); Saqib Badar, Bellevue, WA (US); Zeeshan Jahangir, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/054,630

(22) Filed: Aug. 3, 2018

(65) Prior Publication Data

US 2018/0375903 A1 Dec. 27, 2018

Related U.S. Application Data

(63) Continuation of application No. 14/942,314, filed on Nov. 16, 2015, now Pat. No. 10,044,769.

(Continued)

(51) Int. Cl.
  *H04L 12/50* (2006.01)
  *H04L 29/06* (2006.01)
  *H04W 36/14* (2009.01)

(52) U.S. Cl.
  CPC ........ *H04L 65/1046* (2013.01); *H04L 65/105* (2013.01); *H04L 65/1006* (2013.01);
  (Continued)

(58) Field of Classification Search
  CPC .................................................... H04L 12/50
  (Continued)

(56) References Cited

U.S. PATENT DOCUMENTS

2007/0111752 A1 5/2007 Pazhyannur
2007/0248079 A1 10/2007 Jayaram et al.
(Continued)

FOREIGN PATENT DOCUMENTS

CN 101090567 A 12/2007
CN 101180876 A 5/2008
(Continued)

OTHER PUBLICATIONS

3GPP Technical Specifications, 123078v120000p, Digital Cellular Telecommunications System (Phase 2+), Universal Mobile Telecommunications System (UMTS), Customized Applications for Mobile network Enhanced Logic (CAMEL) Phase 4, Stage 2, Oct. 2014, 752 pgs (see specifically PDF pp. 1, 4-19, 21-23, 27-39, 44-69, 483-489, 517-524, 625, 630, 639, 658-666).

(Continued)

*Primary Examiner* — Dang T Ton
(74) *Attorney, Agent, or Firm* — Lee & Hayes, P.C.

(57) ABSTRACT

Telecommunications network components configured to manage call control of a communication session of user equipment are described herein. An anchoring network device may proxy signaling traffic for the communication session. The anchoring network device may determine a routing identifier based at least in part on which access network, or which type of access network, is carrying the communication session, and may transmit state information of the communication session to a call-control server in association with the routing identifier. The call-control server may provide control information of the communication session to the anchoring network device in response to the state information. The anchoring network device may modify the communication session, e.g., by adding or dropping one or more parties, in response to the control information. The routing identifier may be determined based at (Continued)

least in part on capabilities of a communication session indicated in a session-initiation message.

20 Claims, 8 Drawing Sheets

Related U.S. Application Data

(60) Provisional application No. 62/081,378, filed on Nov. 18, 2014.

(52) U.S. Cl.
CPC ...... *H04L 65/1016* (2013.01); *H04L 65/1069* (2013.01); *H04L 65/1093* (2013.01); *H04W 36/14* (2013.01)

(58) Field of Classification Search
USPC ........................................................ 370/400
See application file for complete search history.

(56) References Cited

U.S. PATENT DOCUMENTS

| | | | |
|---|---|---|---|
| 2009/0190573 A1* | 7/2009 | Siegel ................ | H04L 65/1016 370/352 |
| 2009/0191871 A1 | 7/2009 | Siegel et al. | |
| 2009/0191873 A1 | 7/2009 | Siegel et al. | |
| 2010/0287079 A1 | 11/2010 | Cai et al. | |
| 2013/0337804 A1 | 12/2013 | Boulos | |
| 2014/0160994 A1 | 6/2014 | Garcia Martin et al. | |
| 2014/0242980 A1 | 8/2014 | Shah | |
| 2016/0142447 A1 | 5/2016 | Mufti et al. | |

FOREIGN PATENT DOCUMENTS

| | | |
|---|---|---|
| CN | 101370307 a | 2/2009 |
| CN | 101606403 A | 12/2009 |
| CN | 102571549 A | 7/2012 |
| EP | 2611100 A1 | 7/2012 |
| WO | WO2007144027 A1 | 12/2007 |

OTHER PUBLICATIONS

3GPP Technical Specifications, 123278v120000p—CAMEL-IMS, Digital Cellular Telecommunications System (Phase 2+), Universal Mobile Telecommunications System (UMTS), Customized Applications for Mobile network Enhanced Logic (CAMEL) Phase 4, Stage 2, Oct. 2014, 155 pgs (see specifically PDF pp. 1, 4-7, 9-20, 23-24, 135-137, 147).

3GPP Technical Specifications, 129078v120000p, Digital Cellular Telecommunications System (Phase 2+), Universal Mobile Telecommunications System (UMTS), Customized Applications for Mobile network Enhanced Logic (CAMEL) Phase X, Oct. 2014, 223 pgs (see specifically PDF pp. 1, 4-14, 16, 19-28, 68-69, 143-146).

"Intelligent Network Services Migration, More Value for the Voice Over LTE Subscriber", Technology White Paper, Alcatel Lucent, etrieved Apr. 2016 from http://www.tmcnet.com/tmc/whitepapers/documents/whitepapers/2013/6683-intelligent-network-services-migration-more-value-the-voice.pdf, Oct. 2013,11 pgs.

The Extended European Search Report dated Mar. 23, 2018 for European Patent Application No. 15861562.5, 8 pages.

Nokia,"Voice Evolution, Leveraging Voice Over Wi-Fi", Presentation, retrieved Apr. 2016 from http://networks.nokia.com/file/36441/nokia-voice-evolution-leveraging-voice-over-wi-fi-webinar-presentation, 2014, 22 pgs.

Office Action for U.S. Appl. No. 14/942,314, dated Nov. 9, 2017, Mufti, "Telecommunications Network Call Control", 10 Pages.

Office action for U.S. Appl. No. 14/942,314, dated Jul. 3, 2017, Mufti, et al., "Telecommunications Network Call Control", # pages.

The PCT Search Report and Written Opinion dated Mar. 31, 2016 for PCT application No. PCT/US2015/061033, 9 pages.

Translated copy of the Chinese Office Action dated Nov. 7, 2019, for Chinese Patent Application No. 201580062080.6, a counterpart foreign application of the U.S. Appl. No. 14/942,314, 20 pages.

* cited by examiner

TELECOMMUNICATIONS NETWORK CALL CONTROL

CROSS-REFERENCE TO RELATED APPLICATION

This application is a continuation of co-pending U.S. patent application Ser. No. 14/942,314 filed Nov. 16, 2015, entitled "Telecommunications Network Call Control," which is a nonprovisional application of, and claims priority to and the benefit of, U.S. patent application Ser. No. 62/081,378, filed Nov. 18, 2014 and entitled "Distinct mscAddress in IDP on Per Access Domain," both of which are incorporated herein by reference in their entirety.

BACKGROUND

Modern telecommunications networks such as cellular telephone networks can support a variety of advanced call-control services, such as call forwarding, pre-paid calling, adding or dropping call parties, or communicating pictures or video. For example, the Customised Applications for Mobile network Enhanced Logic (CAMEL) standard provides call-control services to users of second-generation (2G) and third-generation (3G) cellular networks such as Global System for Mobile Communications (GSM) networks or Universal Mobile Telecommunications System (UMTS) networks. More recently, fourth-generation (4G) cellular networks such as Long Term Evolution (LTE) access networks, interoperating with Internet Protocol (IP) Multimedia Subsystem (IMS) core networks, have begun to provide packet-switched (PS) voice and data connections. Such packet-switched connections can provide greater speed and throughput than do circuit-switched (CS) connections, and can make packet-switched data from other networks, such as the Internet, more readily available. Most 4G cellular networks, however, still additionally use access networks that provide circuit-switched connections, such as GSM or UNITS, due to the substantial infrastructure investment needed to expand packet-switched access networks. Such circuit-switched access networks may provide comparable or, at times, better speed and quality than packet-switched access networks for some types of data, including synchronous communications such as full-duplex voice communications.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

This disclosure describes, in part, a telecommunications network configured to implement call control of a communication session of user equipment. Throughout this disclosure, the noun "call" is synonymous with "communication session" unless otherwise specified. The user equipment may be a cellular telephone, such as a feature phone or smartphone. The communication session may be anchored at an anchoring network device. The anchoring network device may determine a routing identifier based at least in part on capabilities of the communication session such as an access-network type, transmit the routing identifier and state information of the communication session to a call-control server, receive control information, and modify the communication session according to the control information. For example, the anchoring network device may add, drop, or transfer participants in the communication session as specified by the control information. The capabilities of a communication session are determined in part on, e.g., the user equipment and access networks involved. Providing a routing identifier can permit the call-control server to provide services appropriate to the particular devices involved in a particular communication session.

In some examples, call control is performed on or in new or existing communication sessions. Example call-control functions can be provided by IMS application servers (ASes) such as a telephony application server (TAS) or a service centralization and continuity application server (SCC-AS), CAMEL servers, or Signaling System 7 (SS7) Intelligent Network Application Protocol (INAP) servers. Example call-control functions can include, but are not limited to, adding, dropping, or transferring participants to, from, or between communication sessions; multi-party conferencing; transmitting multimedia data (e.g., video calling or videoconferencing); injecting voice announcements, intercept tones, or other audio or media into a communication session; number redirection, e.g., for toll-free calls, "N-1-1" or other calls not tied to a specific area code (e.g., in the United States, 9-1-1 for emergencies or 5-1-1 for traffic information), hunt groups, backup phone numbers, short-digit extension dialing, or user-specified call forwarding; calling-card or prepaid calling; adjusting rate or charging information of the communication session; processing of vertical service codes or other codes for, e.g., repeat dialing, call return, intercom ringing, call blocking, anonymous calling, do not disturb, or other custom local-area signaling services; voicemail, time-and-date, or other interactive voice response (IVR) services; voice or face recognition based on media transmitted during a communication session; or collecting dual-tone multi-frequency (DTME) tones.

Figure 1:
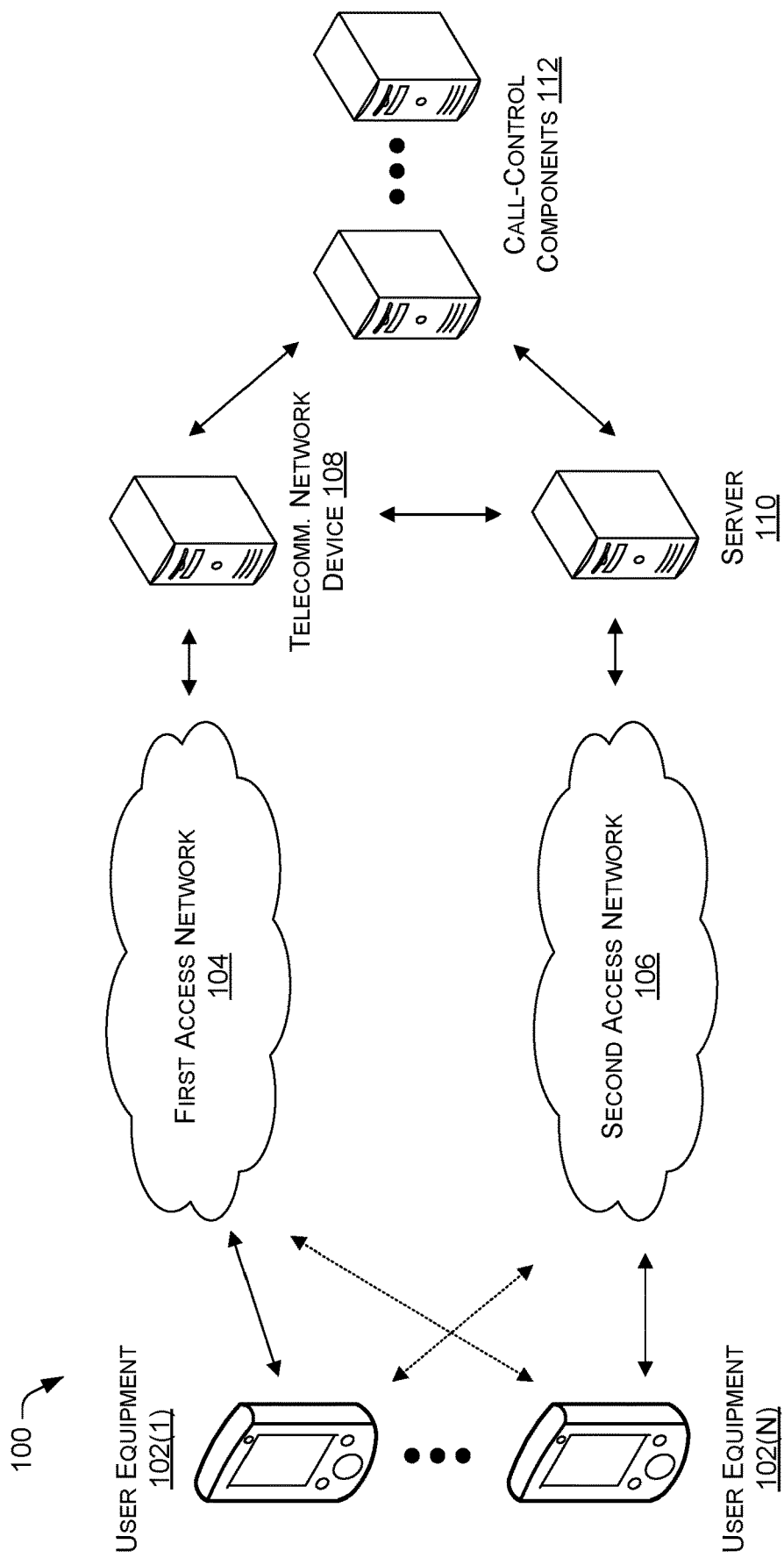
FIG. 1 illustrates an overview of devices involved in a call control of a communication session of user equipment.

FIG. 1 illustrates an example telecommunications network 100 and shows an overview of devices involved in provision of call-control services to user equipment. The telecommunications network 100 includes user equipment (UE) 102(1)-102(N) (individually or collectively referred to herein with reference 102), where N is any integer greater than or equal to 1. The UE 102 (a "terminal") may be or include any sort of device capable of cellular or wireless network communication, such as a cellular phone, a tablet computer, a personal digital assistant (PDA), a personal computer (PC), a laptop computer, a media center, a work station, etc. Examples of UE 102 are described below with reference to FIG. 3.

In some embodiments, the UE 102 may have a radio and be configured to tune that radio to licensed wireless spectrum utilized by packet-switched access networks, such as LTE access networks. UE 102 may also be configured to tune the radio to wireless spectrum utilized by circuit-switched access networks, such as GSM access networks or UMTS access networks. UE 102 may also be configured to tune the radio to wireless spectrum utilized by local-area network (LAN) (or personal-area network, PAN, and likewise throughout) access networks, such as WIFI networks. When equipped with a single radio, UE 102 may only be connected to one of these access networks at a time.

In some examples, UE 102 can communicate, e.g., via a first access network 104 of a first type or a second access network 106 of a second, different type. The first type may be a packet-switched (PS) type (e.g., LTE) and the second type may be a circuit-switched (CS) type (e.g., GSM). UE 102 may participate in a handover between first access network 104 and second access network 106, e.g., as a user moves in and out of coverage areas of individual access networks 104 or 106.

In some examples, the first access network 104 or the second access network 106 may be any sort of access network, such as a GSM or UNITS network; a universal terrestrial radio network (UTRAN) or an Enhanced Data rates for GSM Evolution (EDGE) radio access network (GERAN); an evolved universal terrestrial radio access network (E-UTRAN), a WIFI (IEEE 802.11) or other LAN access network; or a satellite or terrestrial wide-area access network such as a wireless microwave access (WIMAX) network. In some examples, the first access network 104 or the second access network 106 may include a base station (a "NodeB"), as well as a radio network controller (RNC). In some examples, the first access network 104 or the second access network 106 may use any sort of air interface, such as a code division multiple access (CDMA), time division multiple access (TDMA), or frequency division multiple access (FDMA) air interface. In some examples, the first access network 104 may provided packet-switched connections and the second access network 106 may provide circuit-switched connections. In some examples, the first access network 104 may be a packet-switched cellular type of access network and the second access network 106 may be a packet-switched local-area-network type of access network. Examples of LAN access networks can include IEEE 802.11 (WIFI) and IEEE 802.15.1 (BLUETOOTH).

In some examples, wired access networks may be used, exclusively or in combination with wireless access networks. Examples include Plain Old Telephone Service, POTS, or Public Switched Telephone Network, PSTN, lines, optical (e.g., Synchronous Optical NETwork, SONET) technologies, Asynchronous Transfer Mode (ATM), and other network technologies, e.g., configured to transport Internet Protocol (IP) packets. In some examples, the telecommunications network 100 can include or be communicatively connected with an interworking function (IWF) or other device bridging networks, e.g., LTE, 3G, and POTS networks. In some examples, the IWF can bridge Signaling System 7 (SS7) traffic from the PSTN into the telecommunications network 100, e.g., permitting PSTN customers to place calls to cellular customers and vice versa.

In the illustrated example, UE 102 can communicate via first access network 104 with a telecommunications network device 108 (e.g., mobility management entity, MME), or via second access network 106 with a server 110. In some embodiments, the server 110 may be or include a mobile switching center (MSC) server (MSS) associated with the second access network 106, e.g., a CS access network. The telecommunications network device 108 and the server 110 are examples of access devices that can control or modify communications with UE 102 via access network(s) 104 or 106.

A handover between access networks can include, for example, a handover from packet-switched first access network 104 to circuit-switched second access network 106. However, handover is not limited to that example. A handover in various examples can be a handover from a circuit-switched access network to a packet-switched access network, or in general between a first access network of a first type and a second access network, e.g., of the first type or of a second, different type. Example network types may include WI-FI networks carrying voice-over-Internet-Protocol (VoIP) communication sessions, wireline networks such as Ethernet, or wireless networks such as those used for communications via satellites.

Figure 2:
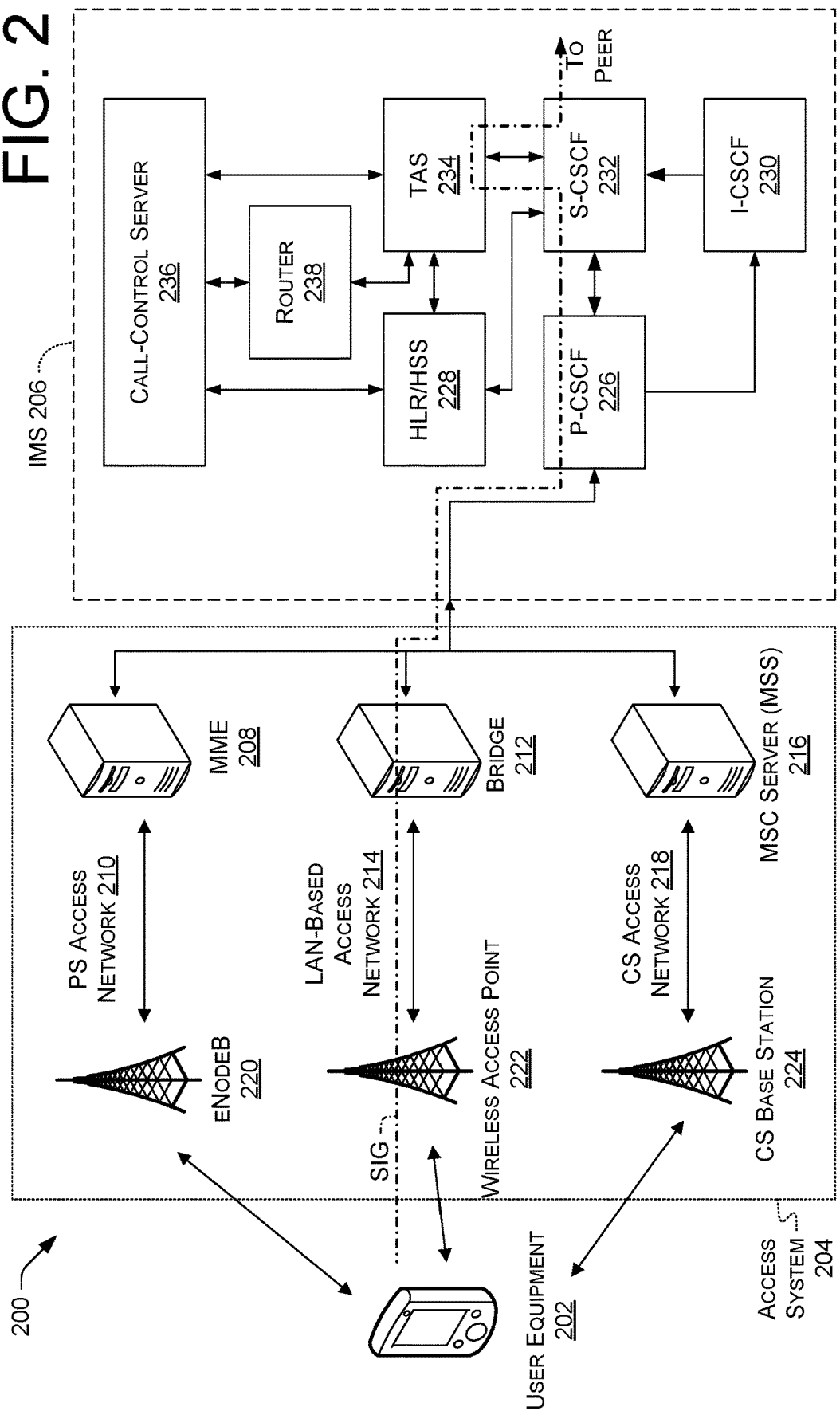
FIG. 2 illustrates an example telecommunications network, including components used to perform call control of the communication session.
Figure 3:
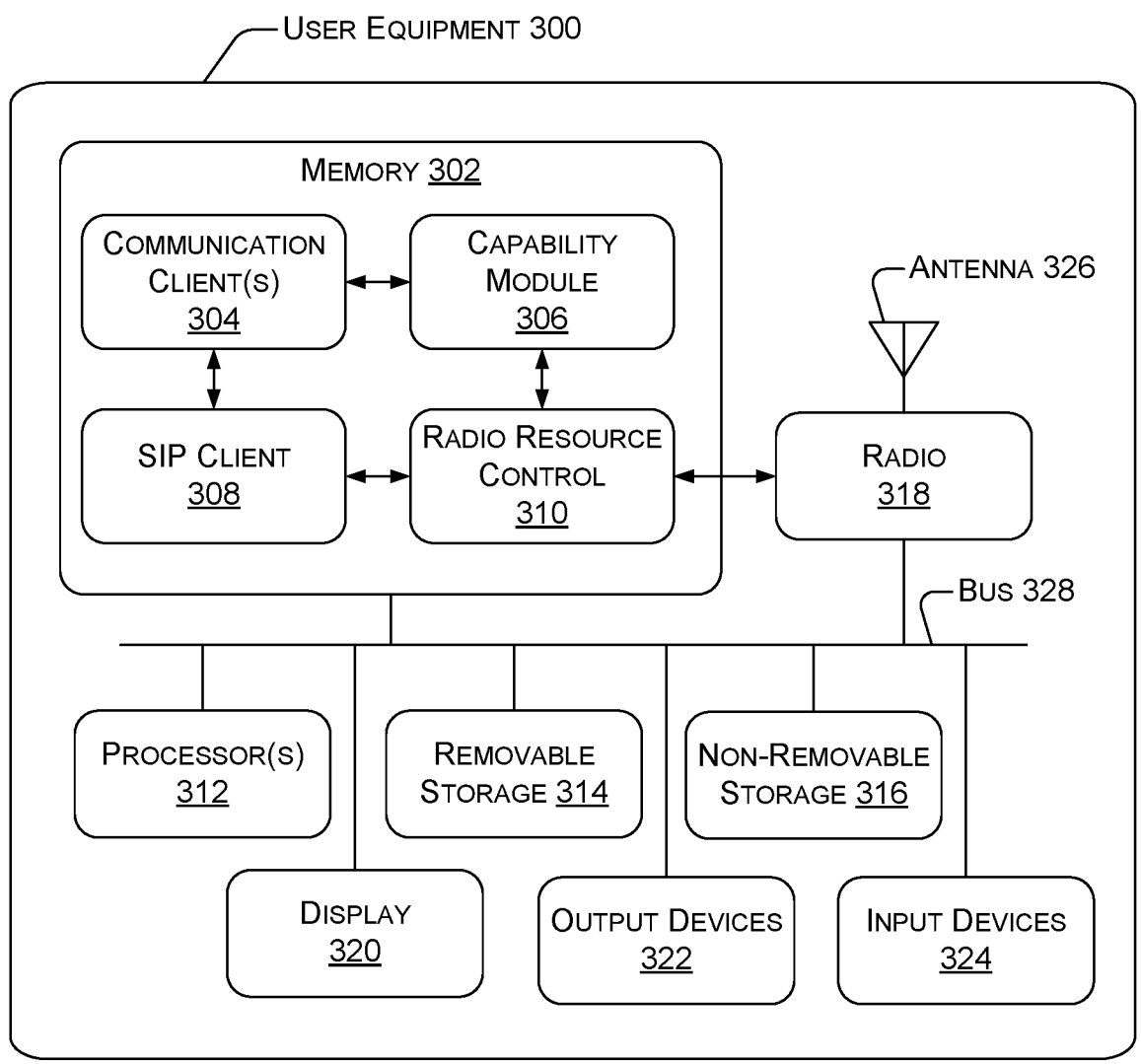
FIG. 3 illustrates a component level view of user equipment capable of engaging in a communication session.
Figure 4:
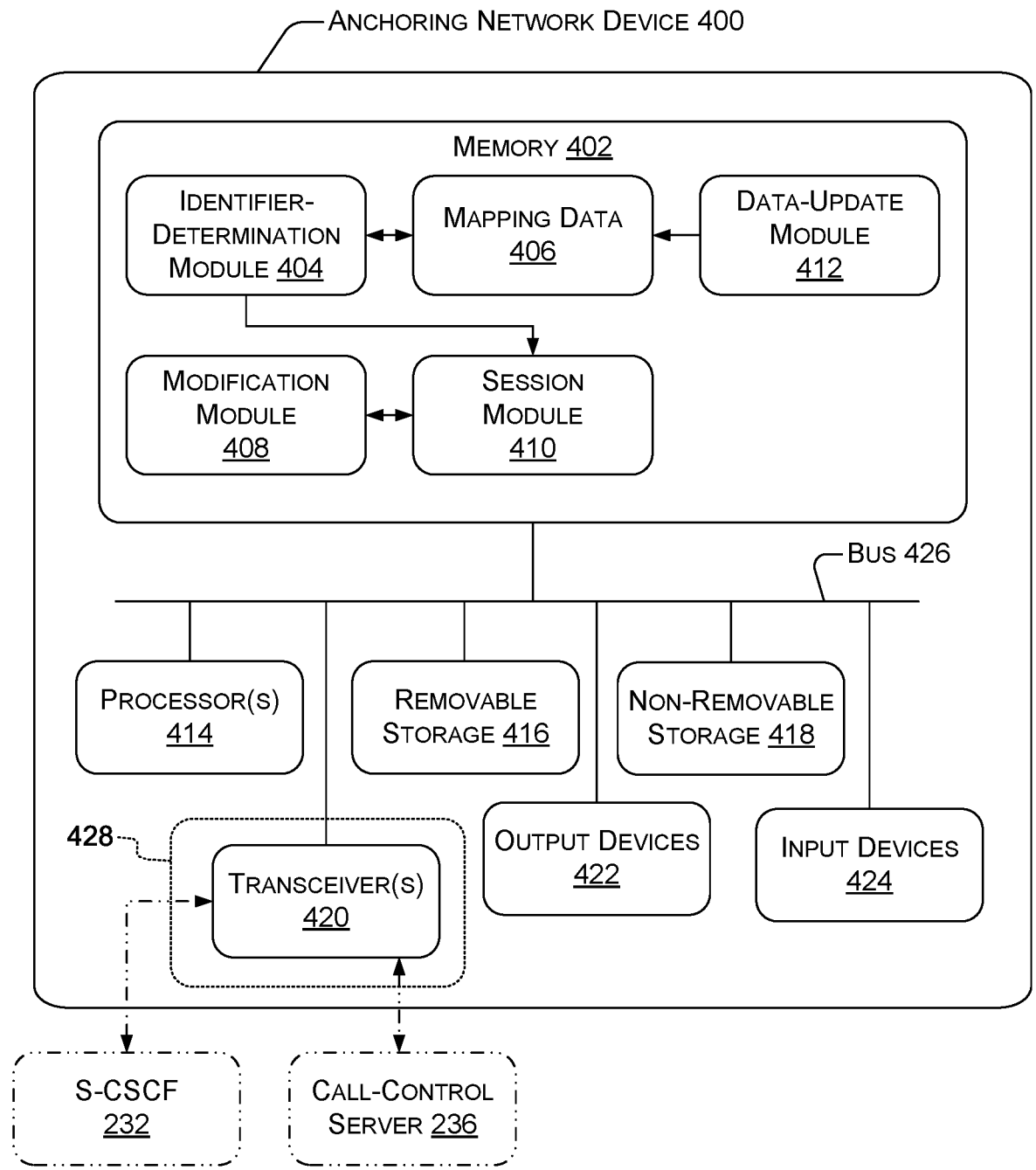
FIG. 4 illustrates a component level view of a telecommunications network device capable of managing call control of a communication session of user equipment, e.g., to provide advanced services.

The user equipment 102 may further be configured to initiate or receive a communication session, such as a voice call, a video call, or another sort of synchronous communication. Initiation of such communications may involve communication clients and session initiation protocol (SIP) clients communicatively connected with components of the telecommunications network, e.g., call-control components 112. Initiation and call control of a communication session, and components involved therein, are illustrated in FIGS. 2, 3, and 4 and described in further detail herein.

The UE 102 may initiate the communication session using a connection to the first access network 104. The first access network 104 may be secured using, for example, information from a Subscriber Identity Module (SIM) card of the UE 102, or may be non-secured. The first access network 104 connects the UE 102 to a telecommunications network. A routing device of the first access network 104 may communicate with a device of the telecommunications network 100, such as the telecommunications network device 108.

The telecommunications network device 108 may include a gateway device, such as an Evolved Packet Data Gateway (ePDG). An example telecommunications network device 108 is illustrated in FIG. 4 and described below with reference to that figure. Further, the telecommunications network device 108, as well as the server 110 and the call-control components 112, may each be or include a server or server farm, multiple, distributed server farms, a mainframe, a work station, a personal computer (PC), a laptop computer, a tablet computer, an embedded system, or any other sort of device or devices. In one implementation, one or more of telecommunications network device 108, the server 110, and the call-control components 112 may represent a plurality of computing devices working in communication, such as a cloud computing network of nodes. Also, the telecommunications network device 108, the server 110, and the call-control components 112 may each be or include devices of a telecommunications network. In various embodiments, the call-control components 112 represent components of an IMS of the telecommunications network. Examples of such components are described below with reference to FIG. 2. Examples of the telecommunications network device 108, the server 110, and the call-control components 112 are illustrated in FIG. 2 and are described in greater detail with reference to that figure.

As noted above, the Session Initiation Protocol (SIP, RFC 3261) can be used to establish and manage communication sessions. A communication session typically passes through several phases over its life. These are described with reference to a voice call in the circuit-switched domain but are not limited thereto. For LTE, the phases are defined in 3GPP TS 24.237 version 12.6.0 Release 12, p. 19 and in 3GPP TS 24.229 version 10.9.0 Release 10, pp. 96-98, or subsequent versions of those standards.

To initiate a communication session, e.g., in response to a user's dialing a phone number (e.g., "867-5309"), originating user equipment 102(1) sends a SIP INVITE request via first access network 104 to terminating user equipment 102(N). This begins a "pre-alerting" phase of the session in some examples. In some examples, pre-alerting begins when the terminating user equipment 102(N) responds with a SIP 100 Trying, a SIP 183 Session in Progress, or both. The terminating user equipment 102(N) then provides a SIP response carrying a 180 response code, signifying "Ringing." This begins an "alerting" phase of the session, during which the terminating user equipment 102(N) provides an indication, e.g., to a user thereof, that a call is incoming. Examples of indications include vibrations and audible ringtones. The SIP response is referred to as a "SIP 180 Ringing response", and likewise for other SIP response codes described herein. As used herein, a SIP response code ending in "xx", e.g., a SIP 1xx Provisional response, signifies any response of, e.g., class 1 of SIP responses (RFC 3261, § 7.2).

When terminating user equipment 102(N) accepts the communication session (e.g., a user of UE 102(N) chooses to answer the call), terminating user equipment 102(N) sends a SIP 200 OK response to originating user equipment 102(1). This begins an "established" phase of the communication session, during which data can be exchanged between originating user equipment 102(1) and terminating user equipment 102(N). In an example, the data includes digitized audio of a voice call. The alerting and pre-alerting phases are referred to collectively as a "pre-establishment phase." The pre-establishment phase corresponds to a SIP "early dialog state" and the established phase corresponds to a SIP "confirmed dialog state" (RFC 3261, § 12).

In some examples, SIP requests and responses may pass to or through various SIP proxies, user-agent servers or clients, or back-to-back user agents (B2BUAs). As used herein, an "anchoring network device" is a core network device (e.g., integrated with telecommunications network device 108, server 110, call-control component 112, or another component such as a TAS or SCC-AS) through which SIP traffic for a communication session is proxied (or otherwise passes, and likewise throughout) for the duration of the established phase. That session is "anchored" at the anchoring network device. Anchoring SIP traffic for a session can increase network robustness by isolating the two sides of the anchoring network device. For example, terminating user equipment 102(N) is not required to change its SIP route to originating user equipment 102(1) when originating user equipment 102(1) is handed over from first access network 104 to second access network 106, since that SIP route passes through an anchoring network device. In some examples, anchoring takes place in response to receipt by an anchoring network device of a SIP INVITE, and the anchoring network device transmits a SIP 183 Session in Progress once anchoring is complete, i.e., once anchoring network device has recorded an indication that the communication session is anchored at that anchoring network device. In some examples, the anchoring network device includes at least a TAS or a service switching function (SSF) such as a CAMEL gsmSSF or IMS SSF (IM-SSF).

Call-control services are generally provided by call-control components 112 independently of the type of access network(s) used for any particular communication session. This permits providing consistent call-control services between, e.g., PS and CS callers, or throughout a communication session when one party leaves a PS coverage area and hands over to a CS access network. However, in some prior schemes, this independence can prevent effectively providing differentiated services specific to particular types of access networks. For example, it may be desirable to provide video-calling services only to terminals connected via high-speed access networks such as an LTE network. In another example, it may be desirable to charge call minutes against a pre-paid account when UE 102 is connected via a cellular access network, but not when UE 102 is connected via a LAN access network. It is therefore desirable to provide the call-control components 112 information regarding the access network(s) used in a communication session or other information regarding capabilities of the communication session. Some prior schemes do not provide this information.

Throughout this disclosure, other devices can be used in conjunction with listed devices. For example, a telecommunications network can include many core network devices, only some of which implement functions described herein for core network devices. Similarly, a telecommunications network can include many anchoring network devices, only some of which implement functions described herein for anchoring network devices.

Example Telecommunications Network

FIG. 2 illustrates an example telecommunications network 200. User equipment 202 communicates with access system 204 of the telecommunications network. Access system 204 can include a first access network of a first type (e.g., LTE) and a second access network of a second, different type (e.g., WIFI). Each of the first access network and the second access network can be configured to selectively carry a communication session of user equipment 202. For example, voice calls can be carried over the first access network using voice-over-LTE (VoLTE) and over the second access network using voice-over-WIFI (VoWIFI). In some examples, the first type is a packet-switched cellular type and the second type is a packet-switched local-area-network type. IMS 206 communicates with access system 204 and provides media-handling services, e.g., to route video or voice data or to maintain continuity of the communication session during handover of the communication session.

In the illustrated example, access system 204 includes at least an MME 208 associated with a packet-switched access network 210, a bridge 212 (or other packet relay) associated with a LAN-based access network 214, or an MSS 216 associated with a circuit-switched access network 218. In an example, the packet-switched access network 210 is the first access network and the LAN-based access network 214 is the second access network.

The packet-switched access network 210, e.g., an LTE access network, may include an eNodeB 220, e.g., a 4G base station or other access point, that provides connectivity to the packet-switched access network 210. The LAN-based access network 214, e.g., a WIFI network, may include a wireless access point (WAP) 222, e.g., a WIFI WAP, that provides connectivity to the LAN-based access network 214. The circuit-switched access network 218 may include a CS base station 224 that provides connectivity to the circuit-switched access 218. The IMS 206 of the telecommunications network may include a number of nodes, such as a proxy call session control function (P-CSCF) 226, a home location register (HLR)/home subscriber server (HSS) 228, an interrogating call session control function (I-CSCF) 230, a serving call session control function (S-CSCF) 232, an a TAS 234, and a call-control server 236. The call-control server 236 can alternatively be located outside the IMS 206 and be communicatively connected with the IMS 206. The call-control server 236 can include, e.g., a service control point (SCP) a implementing a service control function (SCF) such as a gsmSCF, or an intelligent peripheral implementing a specialized resource function (SRF). In some examples, the call-control server 236 can include a CAMEL server. In some examples, the call-control server 236 can be included in or integrated with a CAMEL server or other intelligent-network server.

The telecommunications network may also include a number of devices or nodes not illustrated in FIG. 2. Such devices or nodes may include an access transfer control function (ATCF), an access transfer gateway (ATGW), a visitor location register (VLR), a serving general packet radio service (GPRS) support node (SGSN), a gateway GPRS support node (GGSN), a policy control rules function (PCRF) node, a serving gateway (S-GW), a session border controller (SBC), or a media gateway. IMS 206 may further include a number of devices or nodes not illustrated in FIG. 2, such as a presence server and one or more additional CSCFs. A core network of the telecommunications network may be a GPRS core network or an evolved packet core (EPC) network, or may include elements from both types of core networks.

The telecommunications network may provide a variety of services to user equipment 202, such as synchronous communication routing across a public switched telephone network (PSTN). Further services may include call control, switching, authentication, billing, etc. In at least one example, IMS 206 functions and devices communicate using specific services provided by the access system 204 or elements thereof, but are not directly tied to those specific services. For example, IMS 206 devices can intercommunicate using an EPC network, a GSM network, a SONET network, or an Ethernet network.

In initializing a communication session, the user equipment 202 may register the communication session with the IMS 206 of the telecommunications network. To do this, the user equipment 202 sends an initiation SIP REGISTER request to the IMS 206 via an access network, e.g., via the eNodeB 220 and MME 208 of the packet-switched access network 210. The P-CSCF 226 of the IMS 206 may receive the SIP REGISTER request. P-CSCF 226 may forward the REGISTER request directly to S-CSCF 232, or may forward the request to I-CSCF 230, which can locate an appropriate S-CSCF 232, e.g., using stored database information, and forward the REGISTER request to the located S-CSCF 232. In some examples, the P-CSCF 226 is located in a visited network of UE 202 and the I-CSCF 230 and S-CSCF 232 are located in a home network of UE 202. The S-CSCF 232 or other components (omitted for brevity) of the IMS 206 can store information about the user equipment 202 in the HLR/HSS 228 and then send a SIP response to the user equipment 202 to complete the IMS registration of the communication session.

In an example of call-control services, a signaling path ("SIG") of the communication session passes through P-CSCF 226, S-CSCF 232, and TAS 234, as indicated by the dash-dot arrow. After TAS 234, the example SIP signaling path passes back through S-CSCF 232 to a peer (not shown). In an example in which UE 202 is an originating (MO) UE, the peer can be, e.g., an S-CSCF corresponding to a terminating (MT) UE (omitted for brevity). As shown, in this example, the signaling path does not reach the call-control server 112. In the illustrated example, the TAS 234 is an anchoring network device and proxies signaling traffic for the communication session, e.g., operating as a SIP proxy or B2BUA. In another example, the MSS 216 can be the anchoring network device and can proxy signaling traffic for the communication session, e.g., GSM or SS7 signaling traffic. In some examples, the anchoring network device can include an IP-Short Message (SM) Gateway AS or a Rich Communications Services (RCS) AS. In some examples, the anchoring network device can be included in or integrated with a TAS or other core network device.

The TAS 234 (or other anchoring device, and likewise throughout) can communicate with a call-control server 236 to provide call-control services to UE 202. In some examples, the TAS 234 includes an SSF, such as a gsmSSF or IM-SSF, configured to communicate with call-control server 236, e.g., via the CAMEL or INAP protocols. In some examples, in response to a particular ongoing state or a particular change in state of the communication session, the TAS 234 can transmit state information including an indication of the state to the call-control server 236. For example, the TAS 234 can notify the call-control server 236 when a communication session is established or terminated, when alerting begins at the called party, when the called party answers, does not answer, or is busy, when DTMF tones are detected during a communication session, or when a handover is to occur or has occurred. In some examples, the TAS 234 can be configured to determine a routing identifier as described below and to transmit the state information of the communication session to the call-control server 236 in association with the routing identifier.

In response to the notification from the TAS 234, e.g., the state information of the communication session, the call-control server 236 can determine control information of the communication session. The call-control server 236 can determine the control information based at least in part on the routing identifier, as discussed below. The call-control server 236 can then transmit or otherwise provide the control information to the TAS 234. The TAS 234 can modify the state of the communication session based at least in part on the control information. For example, the TAS 234 can add or drop one or more parties to the communication session, or perform other call-control functions such as those described above, in response to the control information from the call-control server 236.

In some examples, the TAS 234 is configured to determine a routing identifier based at least in part on information of the one of the first access network and the second access network carrying the communication session. An example of such information includes information of which of the first access network and the second access network is carrying the communication session, e.g., an identifier of an access network of the communication session such as a cell identifier or WAP media access control (MAC) address. In some examples, the TAS 234 is configured to determine a routing identifier based at least in part on a type of the access network carrying the communication session. In some examples using access networks of different types, there can be a unique access-network type for each access network, and the TAS 234 can determine the routing identifier based at least in part on which access network or based at least in part on the access-network type; in these examples, those two determinations are equivalent. In some examples, the TAS 234 is configured to determine a routing identifier based at least in part on information identifying the user equipment 102, such as an international mobile subscriber identity (IMSI), information identifying the communication session, such as a correlation mobile station international subscriber directory number (C-MSISDN), or an identifier of one or more core network components, such as a session transfer number-single radio (STN-SR).

In some examples, the routing identifier includes an E.164 or other telephone number. In some examples, the routing identifier includes a location number or location-number prefix. In some examples, the routing identifier includes an identifier formatted as a location or address in a protocol used for communication between the TAS 228 and the call-control server 236. For example, in a configuration using the CAMEL Application Part (CAP) protocol, the TAS 234 can provide the state information to the call-control server 236 in an Initial Detection Point (Initial DP or IDP) message, e.g., as defined in 3GPP TS 23.078 V12.0.0 (2014 October), § 4.6.1.8. The IDP message can include at least location information indicating an address, e.g., an E.164 international-dialing-plan telephone number, of UE 202, or an MSC address indicating an address of the anchoring network device (e.g., MSS 216 or TAS 234). The TAS 234 can determine the routing identifier by modifying or replacing existing address information in the IDP record. Examples of CAP IDP fields are discussed herein; other IDP fields, or fields of records defined in other protocols, can additionally or alternatively be modified or replaced to carry routing identifiers.

In some examples, the TAS 234 can determine an access-network type of the communication session based at least in part on the signaling traffic, e.g., a SIP P-Access-Network-Info header included with, e.g., a SIP REGISTER request or a SIP INVITE request from the UE 202. In some examples, the TAS 234 can determine the routing identifier using a stored mapping of access-network types to corresponding routing identifiers. Examples are shown in Table 1. The TAS 234 can include the routing identifier in the "mscAddress" field of the CAP IDP message in some examples. Routing identifiers such as those listed in the right column of Table 1 can be selected, e.g., from address ranges allocated for network use and thus not in use by terminals.

TABLE 1

| Access-Network Type | Routing Identifier (E.164), e.g., CAP mscAddress |
|---|---|
| IEEE 802.11 | 11111111111 |
| 3GPP E-UTRAN | 22222222222 |
| 3GPP UTRAN | 33333333333 |
| 3GPP GERAN | 44444444444 |

In other examples, the TAS 234 can determine a location prefix using a stored mapping of access-network types to location prefixes, and form the routing identifier including the location prefix followed by an address of the UE 202, e.g., indicated in a SIP To or From header. Example prefixes are shown in Table 2.

TABLE 2

| Access-Network Type | Routing Identifier, e.g., location prefix |
|---|---|
| IEEE 802.11 | 11 |
| 3GPP E-UTRAN | 22 |

TABLE 2-continued

| Access-Network Type | Routing Identifier, e.g., location prefix |
|---|---|
| 3GPP UTRAN | 33 |
| 3GPP GERAN | 44 |

E.164 addresses such as those carried in the "mscAddress" or "Location Number" fields of a CAP IDP request, or the "Location Number" subfield of the "Location Information" field of a CAP IDP request, can include up to 15 digits, including the country code. Most phone numbers currently in use have fewer than 15 digits, permitting space for a prefix. For example, the German number +49 33203 877 2021 has 14 digits (the "+" is not part of the number), permitting a 1-digit prefix, and the US number +1 800 866 2453 has 11 digits, permitting a 4-digit prefix. For example, for an MO call from +61 491 570 110 via a 3GPP UTRAN (3G GSM), the routing identifier can be an mscAddress of "33333333333" (as in Table 1), or a Location Number of "3361491570110" (as in Table 2). For such a call via a 3GPP E-UTRAN (LTE), the routing identifier can be an mscAddress of "22222222222" (as in Table 1), or a Location Number of "2261491570110" (as in Table 2).

In some examples, an IP-SM gateway can include the routing identifier in an "smscAddress" field of an IDP message. In some examples, an RCS AS can include the routing identifier in the mscAddress field. In some examples, multiple routing identifiers can be used, e.g., as at least two of an mscAddress, smscAddress, and a prefix to the Location Number. In some examples, the TAS 234 can transmit, in association with a routing number, e.g., of any of the types or in any of the fields described above, an address of user equipment participating in the communication session. For example, the TAS 234 can transmit the Location Number of "2261491570110" including the E.164 address "61491570110" in association with the location prefix "22".

In some examples, the TAS 234 can be responsive to a control message to enable or disable the generation of routing identifiers, e.g., with respect to some or all communication sessions anchored by the TAS 234. In some examples, the TAS 234 can store the routing identifier(s) in call detail record(s) (CDRs) corresponding to the communication session. In some examples, the TAS 234 can provide routing identifiers or other information to the call-control server 236 based at least in part on user information retrieved from the HLR/HSS 228, e.g., CAMEL service keys (SKs). For example, the TAS 234 can provide routing identifiers only for users associated with specific SKs.

In some examples, the TAS 234 can include a memory, e.g., a computer-readable memory, storing a mapping between access-network types and routing identifiers. The TAS 234 can be configured to receive a modification instruction and modify the mapping in response to the modification instruction. This can permit dynamically updating the routing identifiers or assignments of routing identifiers to capabilities, increasing flexibility of the telecommunications network.

The call-control server 236 can extract the routing identifier from, e.g., the mscAddress or Location Number fields. The call-control server 236 can then determine the control information, e.g., based at least in part on the routing identifier (e.g., "33333333333" or "33" in the UTRAN examples above). The call-control server 236 can additionally determine the control information, e.g., based at least in part on information about one or more parties to the communication session. The call-control server 236 can retrieve this information, e.g., from the HLR/HSS 228.

In some examples, the telecommunications network 200 includes a routing network device ("router") 238 configured to communicatively connect the TAS 234 and the call-control server 236. In some examples, the router 238 can be or include an SS7 signaling transfer point (STP). In some examples, the call-control server 236 is configured to transmit the routing identifier (from TAS 234) in association with the control information. The router 238 is configured to determine a network address of the TAS 234 (or other anchoring network device, as noted above) based at least in part on the routing identifier transmitted in association with the control information. For example, the router 238 can store a mapping from routing identifiers to network addresses. The router 238 is configured to convey the control information to the TAS 234 using the determined network address. In an example, the TAS 234 provides the routing identifier as an mscAddress. This address is the address the call-control server 236 expects to use to provide the control information to the TAS 234 in this example. The router 238 can map from the routing identifier (e.g., "33333333333") to a network address of the TAS 234, e.g., an E.164 identifier such as +1 800 555 0199, an IP or IPv6 address, or an SS7 point code. The router 238 can determine the network address based at least in part on the routing identifier or other information transmitted in association with the control information, e.g., any fields of the reply to a CAMEL IDP message. Using router 238 can permit call-control server 236 to interoperate with multiple anchoring network devices without requiring call-control server 236 to store network addresses of all the anchoring network devices, reducing memory requirements and processing load on the call-control server 236.

For clarity, the illustrated example is in the context of determining a routing identifer based at least in part on access-network type. However, corresponding components and functions described above can be used for determination or processing of routing information based at least in part on capabilities of the communication session in addition to or instead of access-network type. In these and other examples, the TAS 234 (or other anchoring network device, as noted above) can determine the routing identifier based at least in part on information in addition to or instead of information about the access network for a communication session.

In some examples, the TAS 234 can receive a session-initiation message, e.g., a SIP INVITE request or SIP 1xx response (e.g., a SIP 183 response), indicating capabilities of a communication session. The TAS 234 can determine a routing identifier of the anchoring network device based at least in part on the capabilities. Techniques discussed above with reference to the determination of routing identifiers based at least in part on access-network type can be used in determining routing identifiers based on capabilities. For example, the anchoring network device can store a table mapping capability values or combinations of capability values to routing identifiers. The TAS 234 can transmit the routing identifier and state information of the communication session to a call-control server 236, as discussed above.

The capabilities can be indicated, e.g., in a header or body of the SIP request or response, such as a Session Description Protocol (SDP) body. The capabilities can include at least an access-network type of the communication session, a device type of user equipment 202 participating in the communication session, location information of the user equipment 202, a media capability of the user equipment 202 (e.g., whether or not the UE 202 supports video, or which codecs the UE 202 supports), a virtual-network identifier of the user equipment (e.g., identification of a mobile virtual network operator, MVNO, of UE 202), or an authentication type of the user equipment (e.g., SIM-based or other).

As discussed above, the TAS 234 can receive, from the call-control server 236, control information. The TAS 234 can modify the communication session based at least in part on the control information, e.g., as discussed above.

In some examples, such as for IMS-capable users registering via a CS access network 218, the anchoring network device can receive an indication of user equipment 202, e.g., from MSS 216. The anchoring network device can transmit a request for registration information corresponding to the user equipment. The request can be transmitted, e.g., to HLR/HSS 228. The anchoring network device can, in response to the transmitted request, receive the session-initiation message, e.g., a Diameter message, indicating capabilities of communication sessions in which UE 202 may participate. This can permit providing capability-specific call-control services even to terminals that are not transmitting SIP signaling.

The devices and networks illustrated in FIG. 2 may be examples of the devices and networks illustrated in FIG. 1 and described above. For instance, the MME 208 may be a telecommunications network device 108, the user equipment 202 may be user equipment 102, the IMS 206 and its components 226, 228, 230, 232, 234, or 236 may include one or more call-control components 112, and the MSS 216 may be a server 110. Also, the eNodeB 220 may be an access point for the packet-switched access network 210, and the CS base station 224 may be a base station for the circuit-switched access network 218. Accordingly, the descriptions of the devices and networks of FIG. 1 apply to the devices and networks of FIG. 2. The devices and networks of FIG. 2 may cooperate to accomplish call control, e.g., as shown in FIG. 1 and described above. They may also cooperate to accomplish the initialization of a communication session of user equipment 202.

Example Devices

FIG. 3 illustrates a component level view of user equipment 300 capable of at least some of connecting to a plurality of access networks, engaging in a communication session, originating or receiving signaling traffic, reporting capabilities of a communication session, or handing over (switching access networks) during the communication session. User equipment 300 may be any sort of user equipment, such as user equipment 102 or 202. As illustrated, user equipment 300 comprises a system memory 302 storing communication client(s) 304, capability module 306, SIP client 308, and radio resource control 310. Also, example user equipment 300 includes processor(s) 312, a removable storage 314, a non-removable storage 316, radio 318, a display 320, output device(s) 322, input device(s) 324, and one or more antenna(s) 326 connected to radio 318. Processor 312, radio 318, system memory 302, and other illustrated components of user equipment 300 can be communicatively coupled via bus 328, e.g., a PCI or other computer bus. In some examples, a single-radio voice call continuity (SRVCC) module, omitted for brevity, can perform functions including receiving instructions, such as instructions preparing user equipment 300 for a handover or instructions to complete a handover by tuning the radio 318, performing measurements of access networks, generating measurement reports that include the measurements, and providing the measurement reports to the telecommunications network.

In various embodiments, system memory 302 is volatile (such as RAM), non-volatile (such as ROM, flash memory, etc.), or some combination of the two. The communication client(s) 304 stored in the system memory 302 may enable user equipment 300 to initiate and carry on communication sessions. The communication client(s) 304 may include voice call handlers, video calling clients, gaming and media clients, etc. The communication client(s) 304 may utilize a policy, preferences, etc., in determining which of a number of available access networks the communication client(s) 304 should use in initiating communication sessions. For example, the communication client(s) 304 may utilize a policy or preference that prefers LAN access networks to LTE access networks, LTE access networks to GSM access networks, and GSM access networks to other circuit-switched access networks.

The capability module 306 may be configured to determine or report capabilities of a communication session. Some capabilities of a communication session are determined by individual terminals (e.g., whether or not a terminal is capable of videoconferencing) and some are determined by core network devices (e.g., whether multi-party conferencing can be performed). Accordingly, for example, the capability module 306 can populate SIP headers or other protocol fields to indicate ones of the capabilities of the communication session that are determined by user equipment 300. The capability module 306 may also negotiate preconditions, quality of service (QoS) parameters, or capabilities with core network device(s) or with other terminal(s) participating in the communication session.

The SIP client 308 may participate with the communication client(s) 304 in initiating a communication session by, for example, formulating SIP REGISTER or INVITE requests and sending the requests to the telecommunications network. The radio resource control 310 may interact with the radio 318 and other modules and components of user equipment 300 in order to tune the radio 318 and communicate using the radio 318.

In some embodiments, the processor(s) 312 is a central processing unit (CPU), a graphics processing unit (GPU), or both CPU and GPU, or any other sort of processing unit. Example processing units include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processors (DSPs), and processors incorporating more than one type of device (e.g., a CPU and an FPGA on a single die).

User equipment 300 can also include additional data storage devices (removable and/or non-removable) such as, for example, magnetic disks, optical disks, or tape. Such additional storage is illustrated by removable storage 314 and non-removable storage 316, although any given user equipment 300 may have neither of those, or may only have one of those. Tangible computer-readable media may include volatile and nonvolatile, removable and non-removable media implemented in any method or technology for storage of information, such as computer readable instructions, data structures, program modules, or other data. System memory 302, removable storage 314 and non-removable storage 316 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by user equipment 300. Any such tangible computer-readable media may be part of user equipment 300.

In some embodiments, the radio 318 includes any sort of radio known in the art. For example, radio 318 may be a radio transceiver that performs the function of transmitting and receiving radio frequency communications. The radio 318 and radio resource control 310 may facilitate wireless connectivity between user equipment 300 and various cell towers, base stations and/or access points of access networks, e.g., packet-switched or circuit-switched networks, whether cellular or LAN-based.

In various embodiments, the display 320 is a liquid crystal display (LCD), organic light-emitting diode (OLED) display, or any other type of display commonly used in telecommunication devices. For example, display 320 may be a touch-sensitive display screen, and can then also act as an input device or keypad, such as for providing a soft-key keyboard, navigation buttons, or the like.

In some embodiments, the output devices 322 include any sort of output devices known in the art, such as a display (already described as display 320), speakers, a vibrating mechanism, or a tactile feedback mechanism. Output devices 322 also include ports for one or more peripheral devices, such as headphones, peripheral speakers, or a peripheral display.

In various embodiments, input devices 324 include any sort of input devices known in the art. For example, input devices 324 may include a camera, a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

FIG. 4 illustrates a component level view of an anchoring network device 400 capable of implementing call-control functions of a communication session of user equipment, and related components. The anchoring network device 400 may represent any sort of user equipment or core network device, such as call-control component(s) 112, MSS 216, MME 208, I-CSCF 230, S-CSCF 232, or TAS 234. As illustrated, the anchoring network device 400 comprises a system memory 402 storing a identifier-determination module 404, mapping data 406, a modification module 408, a session module 410, and a data-update module 412. The session module 410 may be configured as a SIP user-agent client (UAC), user-agent server (UAS), proxy, or B2BUA. Also, the anchoring network device 400 includes processor(s) 414 and may include at least one of a removable storage 416, a non-removable storage 418, transceiver(s) 420, output device(s) 422, or input device(s) 424, any or all of which can be communicatively connected via bus 426. In some examples, transceiver(s) 420 can be components of a communications interface 428. Communications interface 428 can include one or more physical or logical ports configured for network communication with other devices such as user equipment 300, FIG. 3, or other anchoring network device(s) 400. In some embodiments, the processor(s) 414 is a central processing unit (CPU), a graphics processing unit (GPU), or both CPU and GPU, or any other sort of processing unit described above with reference to processor 312. In some embodiments, system memory 402 is volatile (such as RAM), non-volatile (such as ROM, flash memory, etc.), or some combination of the two.

The identifier-determination module 404 stored in the system memory 402 may perform a number of functions, including determining routing identifiers for communication sessions, e.g., as described above with reference to FIG. 2. Further details of example functions that may be performed by identifier-determination module 404 are discussed above with reference to FIGS. 1 and 2.

The mapping data 406 may include mappings of access-network types or communication-session capabilities to routing identifiers, such as mscAddress values (e.g., Table 1) or location prefixes (e.g., Table 2). For example, the mapping data 406 may include a geographical database or other information permitting mapping of values carried in a P-Access-Network-Information ("PANI") header to an appropriate routing identifier. Such values ("PANI information") can be added to a SIP request by the UE or an access-network device, e.g., an eNodeB. In some examples, the address of the user equipment can include PANI information. The mapping data 406 can additionally (wholly or partly) or alternatively be stored in a memory or other computer-readable media different from memory 402.

The session module 410 may enable user equipment to perform a SIP registration for a communication session with an IMS or components thereof. The session module 410 may additionally or alternatively intercommunicate with user equipment or other core network devices, such as S-CSCF 232, FIG. 2, to maintain the state of a communication session or respond to user requests during the session.

The session module 410 may additionally or alternatively be configured to receive, via a communications interface such as transceiver(s) 420, a session-initiation message indicating capabilities of a communication session, e.g., as described above. The session module 410 may transmit the routing identifier and state information of the communication session via the communications interface to a call-control server and to receive, from the call-control server via the communications interface, control information. This can be done, e.g., as discussed above with reference to FIG. 2.

The session module 410 may additionally or alternatively be configured to receive an indication of user equipment, transmit a request for registration information corresponding to the user equipment, and receive the session-initiation message indicating capabilities in response to the transmitted request, e.g., as discussed above with reference to FIG. 2.

The modification module 408 can interoperate with the session module 410 to permit implementation of call-control functions. For example, control information from the call-control server 236 (e.g., received via communications interface 428) can indicate that a party should be added to, transferred into or out of, or removed from a communication session. Modification module 408 can, in response to that control information, direct session module 410 to transmit a SIP INVITE, REFER, or BYE request, respectively, to the relevant party.

Modification module 408 or data-update module 412 can be configured to receive a modification instruction and modify the mapping data 406 in response to the modification instruction. For example, modification module 408 or data-update module 412 can transmit requests for modification instructions or responses to modification instructions, e.g., Diameter requests or responses to HSS/HLR 228, to update user information corresponding to UE 202 or other mapping information in mapping data 406.

The example anchoring network device 400 also includes additional data storage devices (removable and/or non-removable) such as, for example, magnetic disks, optical disks, or tape. Such additional storage is illustrated in FIG. 4 by removable storage 416 and non-removable storage 418. System memory 402, removable storage 416 and non-removable storage 418 are all examples of computer-readable storage media. Tangible computer-readable media and computer-readable storage media can be as discussed above with reference to removable storage 314 and non-removable storage 316.

In some embodiments, the transceivers 420 include any sort of transceivers known in the art. For example, transceivers 420 may include a radio transceiver that performs the function of transmitting and receiving radio frequency communications. Also, or instead, the transceivers 420 may include other wireless or wired connectors, such as Ethernet connectors or near-field antennas. The transceivers 420 may facilitate connectivity between a public network, such as packet-switched access network 210, and one or more other devices of a telecommunications network. In some examples, transceivers 420 include one or more wired transceivers communicatively connected, e.g., via SS7, IP, or IPv6 network links, with S-CSCF 232 or call-control server 236 (shown in phantom).

In some embodiments, the output devices 422 include any sort of output devices known in the art, e.g., as described above with reference to output devices 322. In various embodiments, input devices 424 include any sort of input devices known in the art, e.g., as described above with reference to input devices 324.

Example Call Flows

Figure 5:
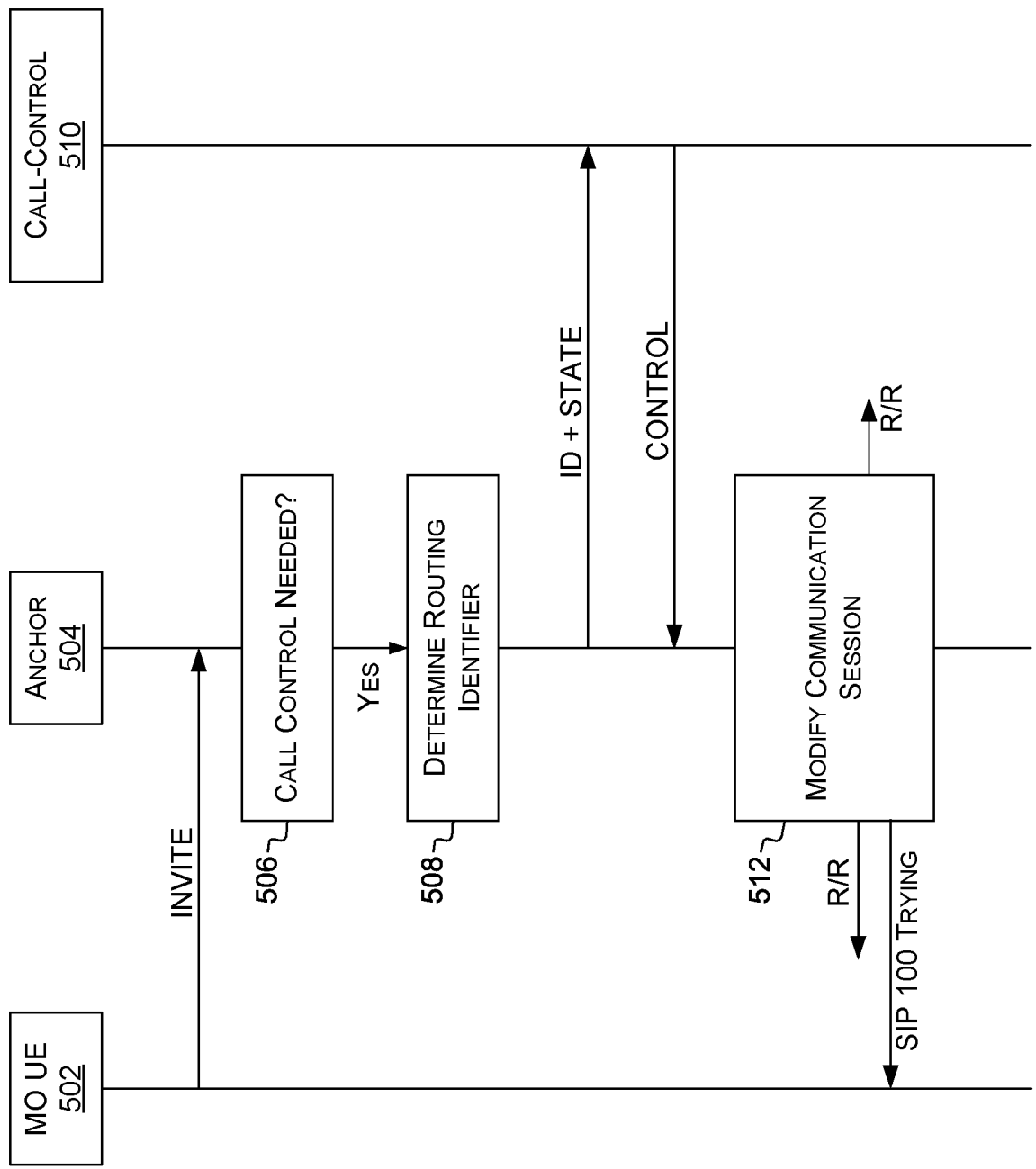
FIG. 5 is a call flow showing an example of call control with respect to an originating mobile terminal.

FIG. 5 is a partial call flow 500 showing examples of call control, e.g., as discussed above with reference to FIGS. 1 and 2. The call flow of FIG. 5 includes UE 502 connected to a telecommunications network via an access network having a type. UE 502 can be configured to originate or terminate communications sessions. Signaling traffic for a communication session is proxied by anchoring network device 504, e.g., TAS 234 or MSS 216.

As shown, anchoring network device 504 receives a session-initiation message from MO UE 502, in this example a SIP INVITE. Anchoring network device 504 determines, at 506, that call control may be applicable to the INVITE, e.g., based at least in part on subscriber information data, such as service key, from HLR/HSS 228. In response to this determination, at 508, anchoring network device 504 determines a routing identifier, e.g., as described above with reference to FIG. 2. The SIP INVITE can include, e.g., PANI information or other information about capabilities of the communication session determined by MO UE 502, and the routing identifier can be determined based at least in part on this information. Anchoring network device 504 can determine the routing identifier, e.g., based at least in part on the access-network type or on capability information included in a header or body (or multiple headers or bodies) of the SIP INVITE request. In an example, the access-network type is carried in a PAM header, as discussed above.

Anchoring network device 504 then sends the routing identifier ("ID") and state information ("STATE") of the communication session to call-control server 510. The state information can include, e.g., an indication that the session is in a pre-alerting phase.

Call-control server 510 then sends control information ("CONTROL") to anchoring network device 504. In response, at 512, anchoring network device 504 modifies the communication session. This can be done, e.g., as described above with reference to FIG. 2 or 4. For example, anchoring network device 504 can transmit one or more requests or responses ("R/R"), e.g., in SIP, Diameter, or other protocols, to UE 502 or other user equipment or network devices. Anchoring network device 504 can transmit one or more requests or responses to other core network devices or terminals, e.g., HSS/HLR 228. In the illustrated example, at least one of the responses is a SIP 100 Trying response to UE 502, indicating that that the communication session is proceeding. In another example, if call-control server 510 indicates the communication session should not proceed, e.g., because the user's prepaid-minutes balance is zero, anchoring network device 504 can transmit a SIP 402 Payment Required response or a SIP 488 Not Acceptable Here response.

Figure 6:
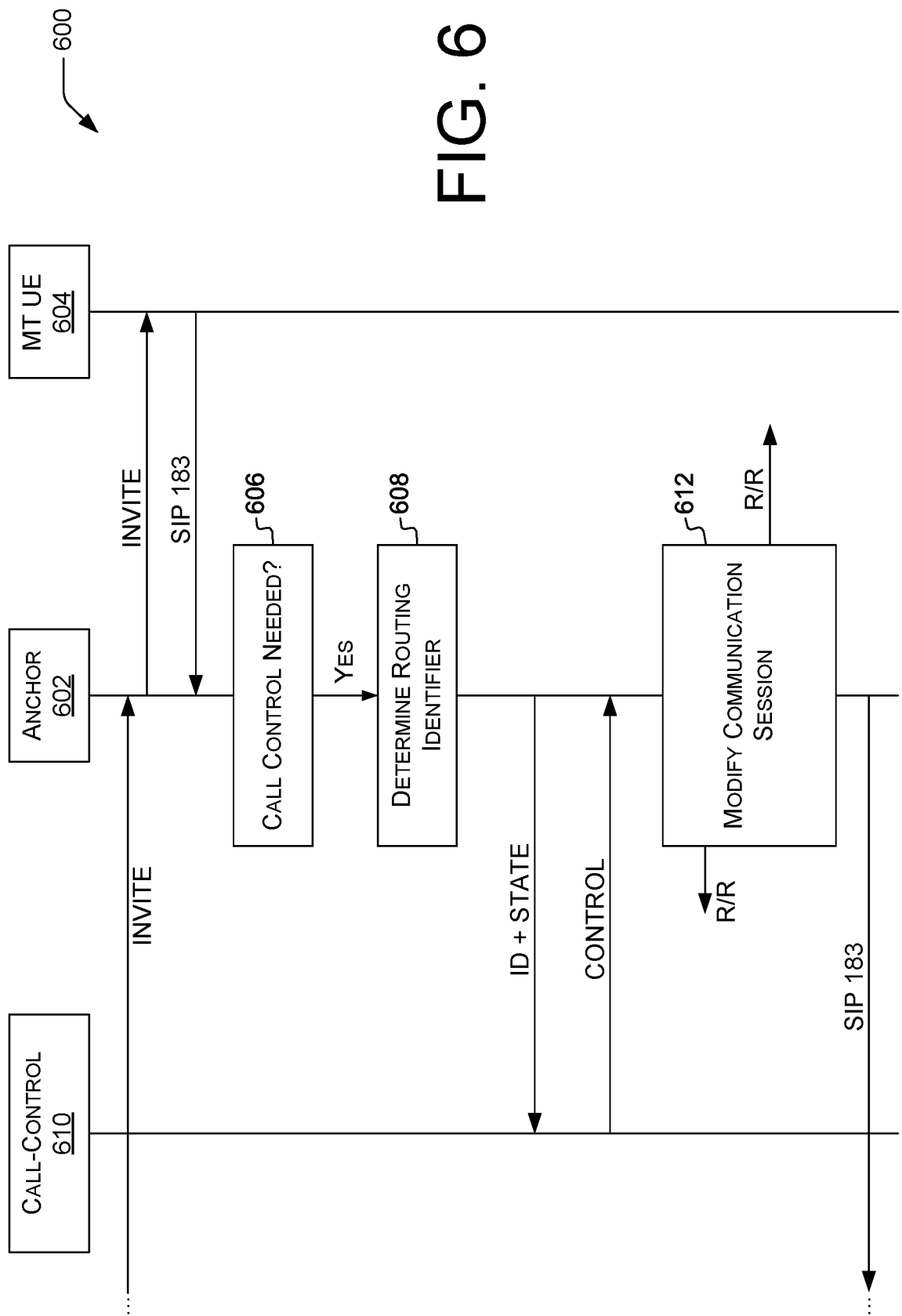
FIG. 6 is a call flow showing an example of call control with respect to a terminating mobile terminal.

FIG. 6 is a partial call flow 600 showing examples of call control. Anchoring network device 602 proxies a SIP INVITE from an originating party to MT UE 604. In some examples, the SIP INVITE can be a session-initiation message. In the illustrated example, MT UE 604 responds to the INVITE with a SIP 183 Session in Progress response, and the SIP 183 response is the session-initiation message. The SIP 183 response can include, e.g., including information used for negotiating preconditions or QoS of the communication session, PANI information, or other information about capabilities of the communication session determined by MT UE 604.

At 606, anchoring network device 602 determines whether call control is needed, e.g., based on service keys or other information. If so, at 608, anchoring network device 602 determines a routing identifier ("ID"), e.g., as described above. Anchoring network device 602 transmits the routing identifier and state information of the communication session ("STATE") to call-control server 610, which responds with control information ("CONTROL"). In response, at 612, anchoring network device 602 modifies the communication session, e.g., by transmitting one or more SIP requests or responses. In the illustrated example, at least one of the responses is a SIP 183 response towards the MO UE to continue setup of the communication session.

Example Processes

Figure 7:
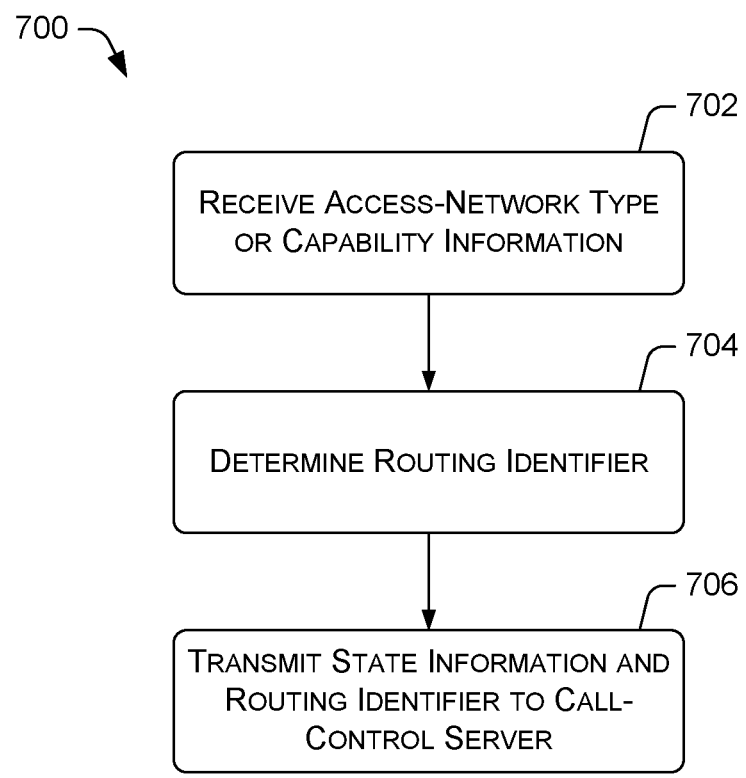
FIG. 7 illustrates an example process performed by an anchoring network device of a telecommunications network for enabling call control of a communication session.
Figure 8:
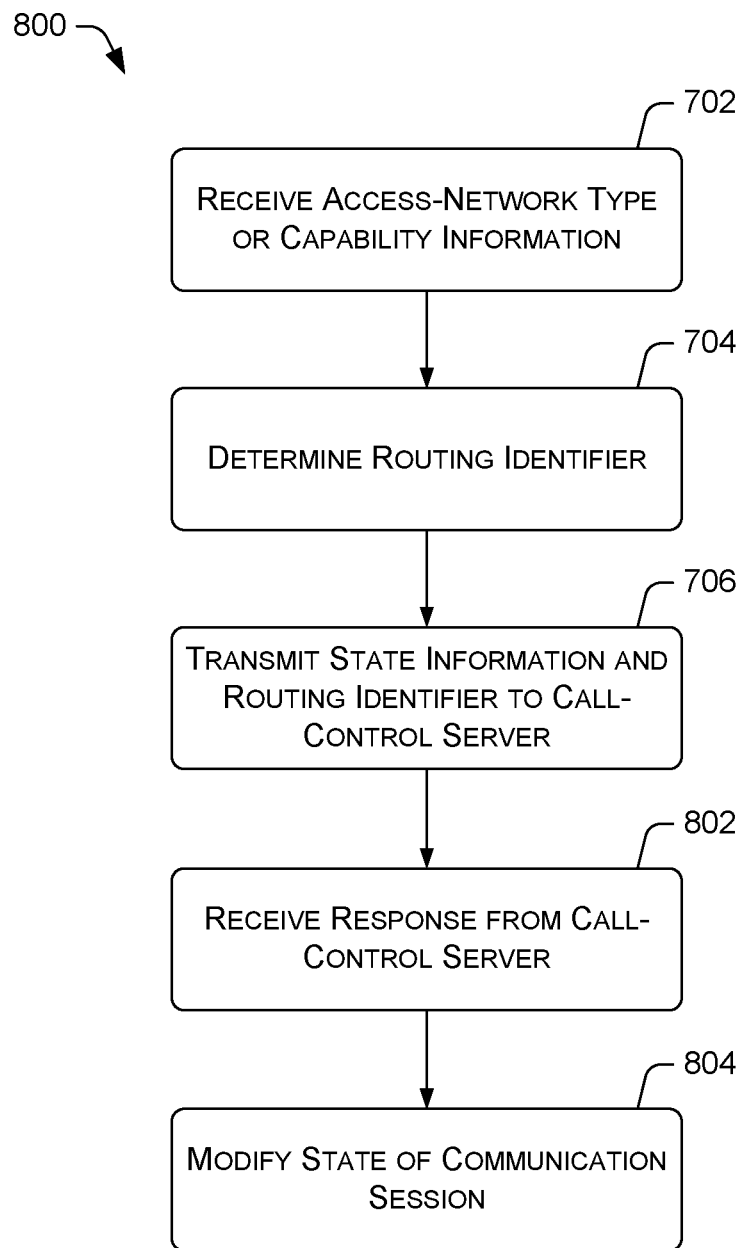
FIG. 8 illustrates an example process performed by an anchoring network device of a telecommunications network for carrying out call control of a communication session.

FIGS. 7 and 8 illustrate example processes. These processes are illustrated as logical flow graphs, each operation of which represents one or more operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. Similarly, the order of data exchanges shown in example call flows of FIGS. 7 and 9 is not intended to be construed as a limitation.

FIG. 7 illustrates an example process 700, e.g., a computer-implemented method, performed by an anchoring network device of a telecommunications network (e.g., TAS 234) for enabling call control of a communication session. The anchoring network device can, e.g., include a service switching function (SSF) such as a CAMEL SSF or gsmSSF. In some examples, a system includes a computer-readable memory and of an anchoring network device configured to perform respective functions discussed below with reference to FIG. 7.

The process includes, at 702, receiving, by the anchoring network device, an indication of an access-network type (or identifier, or other capability information, and likewise throughout) of a communication session of user equipment. The indication can include, e.g., PAM information carried in a SIP header.

At 704, the anchoring network device determines a routing identifier based at least in part on the indication of the access-network type. This can be done, e.g., as discussed above with reference to FIG. 2. In some examples, the routing identifier includes at least an address or a location prefix.

At 706, the anchoring network device transmits an indication of a state of the communication session to a call-control server, e.g., of the telecommunications network or communicatively connected therewith, in association with the routing identifier. The indication can include information that a particular state is ongoing, e.g., that a call is in progress, or that a state has change, e.g., that a call has just gone off- or on-hook, or that DTMF digits have been detected in audio data of the communication session. Other examples are described above.

FIG. 8 illustrates an example process 800, e.g., a computer-implemented method, performed by an anchoring network device of a telecommunications network (e.g., TAS 234) for carrying out call control of a communication session. Blocks 702, 704, and 706 can be as described above with reference to FIG. 7. Block 706 can be followed by block 802.

The process includes, at 802, receiving, by the anchoring network device, a response from the call-control server. The response can include, e.g., control information of the communication session as described above with reference to FIG. 2, 5, or 6.

At 804, the anchoring network device modifies the state of the communication session based at least in part on the response. This can be done, e.g., as described above with reference to FIG. 2. In some examples, at 804, the anchoring network device can add a participant to the communication session, e.g., by transmitting a SIP INVITE; remove a participant from the communication session, e.g., by transmitting a SIP BYE request or a SIP 4xx, 5xx, or 6xx response; transferring the communication session, e.g., by sending a SIP REFER request; updating charging records of the communication session (e.g., to indicate a specific per-minute rate); updating consumption counters of the communication session (e.g., prepaid minutes used); updating consumption limits of the communication session (e.g., prepaid minutes remaining); or other modifications described above.

Associating connection-state information with a routing identifier as described above permits adjusting call control based on characteristics of each individual communication session. This can provide improved performance and reduce waste of network bandwidth compared with attempting to provide advanced call-control services for a particular terminal without reference to its connection environment. Customizing call control based on the communication session may also permit applying only those call-control services relevant to a particular communication session, reducing user frustration. Using a routing identifier can also provide improved isolation between the anchoring network devices and the call-control servers. Using a routing identifier can also provide the call-control servers with information about the connection without requiring that the call-control servers be programmed to operate with the full SIP protocol.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A telecommunications network, comprising:
a call-control server; and
an anchoring network device configured to:
proxy signaling traffic for a communication session;
determine a routing identifier based at least in part on information of the one of a first access network of a first type and a second access network of a second, different type carrying the communication session; and
transmit state information of the communication session to the call-control server in association with the routing identifier.

2. The telecommunications network of claim 1, wherein the call-control server is responsive to the state information of the communication session to transmit control information of the communication session to the anchoring network device.

3. The telecommunications network of claim 2, wherein the anchoring network device is configured to add or drop one or more parties to the communication session in response to the control information.

4. The telecommunications network of claim 2, wherein:
the call-control server is configured to transmit the routing identifier in association with the control information; and
the telecommunications network further comprises a routing network device configured to:
determine a network address of the anchoring network device based at least in part on the routing identifier transmitted in association with the control information; and
convey the control information to the anchoring network device using the determined network address.

5. The telecommunications network of claim 1, wherein the call-control server includes a Customised Applications for Mobile network Enhanced Logic (CAMEL) server.

6. The telecommunications network of claim 1, wherein the anchoring network device includes a telephony application server (TAS).

7. The telecommunications network of claim 1, wherein the anchoring network device is configured to determine an access-network type of the communication session based at least in part on the signaling traffic and to determine the routing identifier using a stored mapping of access-network types to corresponding routing identifiers.

8. The telecommunications network of claim 1, wherein the first type is a packet-switched cellular type and the second type is a packet-switched local-area-network type.

9. A computer-implemented method comprising:
receiving, by an anchoring network device of a telecommunications network, an indication of an access-network type of a communication session of user equipment;
determining, by the anchoring network device, a routing identifier based at least in part on the indication of the access-network type; and
transmitting, by the anchoring network device, an indication of a state of the communication session to a call-control server in association with the routing identifier.

10. The computer-implemented method of claim 9, further comprising:
receiving, by the anchoring network device, a response from the call-control server; and
modifying, by the anchoring network device, the state of the communication session based at least in part on the response.

11. The computer-implemented method of claim 10, wherein the modifying comprises at least adding a participant to the communication session, removing a participant from the communication session, transferring the communication session, updating charging records of the communication session, updating consumption counters of the communication session, or updating consumption limits of the communication session.

12. The computer-implemented method of claim 9, wherein the anchoring network device includes a service switching function (SSF).

13. The computer-implemented method of claim 9, wherein the routing identifier includes at least an address or a location prefix.

14. An anchoring network device comprising:
a communications interface;
one or more computer-readable media having thereon a plurality of modules; and
a processing unit operably coupled to at least one of the computer-readable media and to the network interface, the processing unit adapted to execute modules of the plurality of modules comprising:
a session module configured to receive, via the communications interface, a session-initiation message indicating capabilities of a communication session;
an identifier-determination module configured to determine a routing identifier of the anchoring network device based at least in part on the capabilities; and
a modification module;
wherein the session module is further configured to transmit the routing identifier and state information of the communication session via the communications interface to a call-control server and to receive, from the call-control server via the communications interface, control information; and
the modification module is configured to modify the communication session based at least in part on the control information.

15. The anchoring network device of claim 14, wherein the capabilities include at least an identifier of an access network of the communication session, an access-network type of the communication session, a device type of user equipment participating in the communication session, location information of the user equipment, a media capability of the user equipment, a virtual-network identifier of the user equipment, or an authentication type of the user equipment.

16. The anchoring network device according to claim 14, wherein the anchoring network device includes at least a mobile switching center (MSC), an MSC server (MSS), a TAS, an SSF, a GSM SSF (gsmSSF), or an Internet Protocol (IP) Multimedia Subsystem SSF (IM-SSF).

17. The anchoring network device according to claim 14, wherein the session-initiation message includes a Session Initiation Protocol (SIP) INVITE request or a SIP 183 response and the capabilities of the communication session are indicated in at least one SIP header in the session-initiation message.

18. The anchoring network device according to claim 14, wherein the session module is further configured to:
   receive an indication of user equipment;
   transmit a request for registration information corresponding to the user equipment; and
   receive the session-initiation message indicating capabilities in response to the transmitted request.

19. The anchoring network device according to claim 14, further comprising a data-update module of the plurality of modules and a memory storing a mapping between capabilities and routing identifiers, the data-update module configured to receive a modification instruction and modify the mapping in response to the modification instruction.

20. The anchoring network device according to claim 14, the identifier-determination module further configured to determine the routing identifier including a location prefix and transmit, in association with the routing identifier, an address of user equipment participating in the communication session.

* * * * *